United States Patent
Finkelshtein et al.

(10) Patent No.: US 11,539,740 B1
(45) Date of Patent: Dec. 27, 2022

(54) METHODS FOR PROTECTING CPU DURING DDOS ATTACK AND DEVICES THEREOF

(71) Applicant: F5 Networks, Inc., Seattle, WA (US)

(72) Inventors: Peter Finkelshtein, Tel Aviv (IL); Vadim Krishtal, Tel Aviv (IL)

(73) Assignee: F5, INC., Seattle, WA (US)

( * ) Notice: Subject to any disclaimer, the term of this patent is extended or adjusted under 35 U.S.C. 154(b) by 210 days.

(21) Appl. No.: 16/266,742

(22) Filed: Feb. 4, 2019

Related U.S. Application Data

(60) Provisional application No. 62/625,778, filed on Feb. 2, 2018.

(51) Int. Cl.
| | | |
|---|---|---|
| *H04L 29/06* | (2006.01) | |
| *H04L 9/40* | (2022.01) | |
| *H04L 41/28* | (2022.01) | |
| *H04L 41/0631* | (2022.01) | |

(52) U.S. Cl.
CPC ........ *H04L 63/1458* (2013.01); *H04L 41/065* (2013.01); *H04L 41/28* (2013.01); *H04L 63/1425* (2013.01); *H04L 63/1433* (2013.01)

(58) Field of Classification Search
CPC . H04L 63/1458; H04L 63/20; H04L 63/1408; H04L 41/065; H04L 41/28; H04L 63/1425; H04L 63/1433
See application file for complete search history.

(56) References Cited

U.S. PATENT DOCUMENTS

| | | |
|---|---|---|
| 4,783,828 A | 11/1988 | Sadjadi |
| 5,537,488 A | 7/1996 | Menon |
| 6,118,893 A | 9/2000 | Li |
| 6,748,056 B1 | 6/2004 | Capriotti |
| 6,769,066 B1 | 7/2004 | Botros |
| 7,228,412 B2 | 6/2007 | Freed |
| 7,406,606 B2 | 7/2008 | Chawla |
| 7,441,429 B1 | 10/2008 | Nucci |
| 7,519,834 B1 | 4/2009 | Dondeti |

(Continued)

OTHER PUBLICATIONS

F5 Networks, Inc., "BIG-IP® Application Security Manager™: Implementations", Manual, Nov. 10, 2017, pp. 1-348, version 13.0, F5 Networks, Inc.

(Continued)

*Primary Examiner* — Yogesh Paliwal
(74) *Attorney, Agent, or Firm* — Troutman Pepper Hamilton Sanders LLP

(57) ABSTRACT

Methods, non-transitory computer readable media, and network traffic manager apparatus that assists with protecting a CPU during a DDOS attack includes monitoring network traffic data from plurality of client devices. Each of the plurality of client devices are classified as a valid device or a potential attacker device based on the monitoring. Next a determination of when CPU utilization of a network traffic manager apparatus is greater than a stored threshold value is made. The CPU utilization of the network traffic manager increases as a number of the plurality of client devices classified as the potential attacker device increases. One or more network actions are performed on the plurality of client devices classified as the potential attacker device to protect the CPU when the determination indicates the CPU utilization is greater than the stored threshold value.

16 Claims, 4 Drawing Sheets

(56) References Cited

U.S. PATENT DOCUMENTS

| | | |
|---|---|---|
| 7,624,447 B1 | 11/2009 | Horowitz |
| 7,743,415 B2 | 6/2010 | Poletto |
| 8,572,733 B1 | 10/2013 | Rockwood |
| 8,578,482 B1 | 11/2013 | Yang |
| 8,756,684 B2 | 6/2014 | Frantz |
| 8,886,620 B1 | 11/2014 | Mukerji |
| 8,943,588 B1 | 1/2015 | Speegle |
| 9,032,519 B1 | 5/2015 | Maher |
| 9,077,709 B1 | 7/2015 | Dall |
| 9,203,837 B2 | 12/2015 | Pierson |
| 9,578,055 B1 | 2/2017 | Khanal |
| 9,628,499 B1 | 4/2017 | Yu |
| 9,654,485 B1 | 5/2017 | Neumann |
| 9,900,344 B2 | 2/2018 | Smith |
| 9,942,250 B2 | 4/2018 | Stiansen |
| 9,948,629 B2 | 4/2018 | Eisen |
| 9,967,250 B2 | 5/2018 | Johansson |
| 10,050,792 B1 | 8/2018 | Johnson |
| 10,237,298 B1* | 3/2019 | Nguyen .................. H04L 63/20 |
| 10,397,250 B1 | 8/2019 | Shemesh |
| 2002/0116615 A1 | 8/2002 | Nguyen |
| 2003/0042439 A1 | 3/2003 | Rusu |
| 2003/0073091 A1 | 4/2003 | Krylov |
| 2003/0145232 A1 | 7/2003 | Poletto |
| 2003/0199762 A1 | 10/2003 | Fritz |
| 2004/0037326 A1 | 2/2004 | D'souza |
| 2004/0103283 A1 | 5/2004 | Hornak |
| 2004/0170123 A1 | 9/2004 | Carpenter |
| 2005/0027846 A1 | 2/2005 | Wolfe |
| 2005/0111367 A1 | 5/2005 | Chao |
| 2005/0195840 A1 | 9/2005 | Krapp |
| 2005/0198519 A1 | 9/2005 | Tamura |
| 2006/0031483 A1 | 2/2006 | Lund |
| 2006/0031928 A1 | 2/2006 | Conley |
| 2007/0014276 A1* | 1/2007 | Bettink .................. H04L 45/38 |
| | | 370/351 |
| 2007/0118894 A1 | 5/2007 | Bhatia |
| 2007/0280114 A1 | 12/2007 | Chao |
| 2007/0294187 A1 | 12/2007 | Scherrer |
| 2008/0028467 A1 | 1/2008 | Kommareddy |
| 2008/0263215 A1 | 10/2008 | Schnellbaecher |
| 2008/0320567 A1 | 12/2008 | Shulman |
| 2009/0199297 A1 | 8/2009 | Jarrett |
| 2010/0031315 A1 | 2/2010 | Feng |
| 2010/0070451 A1 | 3/2010 | Hugues |
| 2010/0284282 A1 | 11/2010 | Golic |
| 2010/0325418 A1 | 12/2010 | Kanekar |
| 2011/0012586 A1 | 1/2011 | Montanar |
| 2011/0072516 A1 | 3/2011 | Cohen |
| 2011/0154026 A1 | 6/2011 | Edstrom |
| 2011/0264905 A1 | 10/2011 | Ovsiannikov |
| 2012/0079592 A1 | 3/2012 | Pandrangi |
| 2012/0117239 A1 | 5/2012 | Holloway |
| 2012/0144487 A1 | 6/2012 | Kim |
| 2012/0167210 A1 | 6/2012 | Oro |
| 2012/0173710 A1 | 7/2012 | Rodriguez |
| 2012/0227106 A1 | 9/2012 | Shulman |
| 2012/0323700 A1 | 12/2012 | Aleksandrovich |
| 2013/0080407 A1 | 3/2013 | Levow |
| 2013/0276114 A1 | 10/2013 | Friedrichs |
| 2013/0305365 A1 | 11/2013 | Rubin |
| 2014/0095865 A1 | 4/2014 | Yerra |
| 2014/0289854 A1 | 9/2014 | Mahvi |
| 2014/0298419 A1 | 10/2014 | Boubez |
| 2014/0310805 A1 | 10/2014 | Kandekar |
| 2014/0317739 A1 | 10/2014 | Be'ery |
| 2015/0067328 A1 | 3/2015 | Yin |
| 2015/0088662 A1 | 3/2015 | Moller |
| 2015/0163234 A1 | 6/2015 | Tal |
| 2015/0215334 A1 | 7/2015 | Bingham |
| 2015/0271179 A1 | 9/2015 | Wang |
| 2015/0295945 A1 | 10/2015 | Canzanese |
| 2015/0310196 A1 | 10/2015 | Turgeman |
| 2016/0021084 A1 | 1/2016 | Eisen |
| 2016/0021117 A1 | 1/2016 | Harmon |
| 2016/0127406 A1 | 5/2016 | Smith |
| 2016/0182542 A1* | 6/2016 | Staniford ............ H04L 63/1416 |
| | | 726/23 |
| 2017/0171231 A1 | 6/2017 | Reybok, Jr. |
| 2017/0249306 A1 | 8/2017 | Mien |
| 2017/0318053 A1 | 11/2017 | Singh |
| 2018/0124073 A1 | 5/2018 | Scherman |
| 2018/0124300 A1 | 5/2018 | Brook |
| 2018/0165457 A1 | 6/2018 | Holz |
| 2020/0296125 A1 | 9/2020 | Alderson |

OTHER PUBLICATIONS

BIG-1P® Analytics: Implementations, version 11.3, Nov. 15, 2012, F5 Networks, Inc., pp. 1-40.

F5 Networks, "BIG-1P Local Traffic Manager: Concepts", version 11.4, pp. 1-178, retrieved from https://support.f5.com/kb/en-US/products/bigipltm/manuals/product/ltm-concepts-11-4-0.html on Feb. 12, 2015.

F5 Networks, "BIG-1P Local Traffic Manager: Implementations", version 11.4, pp. 1-234, retrieved from https://support.f5.com/kb/en-us/products/bigipltm/manuals/product/ltm-implementations-11-4-0.html on Feb. 12, 2015.

F5 Networks, "BIG-1P Local Traffic Manager: Monitors Reference", version 11.4, pp. 1-106, retrieved from https://support.f5.com/kb/en-us/products/big-ip ltm/manuals/product/ltm-monitorsreference-11-4-0.html on Feb. 12, 2015.

F5 Networks, "Operations Guide 1.0 F5 Local Traffic Manager and Global Traffic Manager", pp. 1.144, retrieved from https://support.f5.com/kb/en-us/products/bigipltm/manuals/product/f5-1tm-gtm-operations-guide-1-0.html on Feb. 12, 2015.

F5 Networks, "Release Note: BIG-IP LTM and TMOS", version 11.4.1, pp. 1-58, retrieved from https://support.f5.com/kb/en-us/products/bigipltm/releasenotes/product/relnote-ltm-11-4-1.html on Feb. 12, 2015.

F5 Networks, Inc., "BIG-IP Application Security Manager Operations Guide", Manual, Feb. 5, 2016, pp. 1-181, F5 Networks, Inc.

F5 Networks, Inc., "BIG-IP ASM 11.5.0", Release Notes, Apr. 12, 2016, Version 11.5.0.

F5 Networks, Inc., "BIG-IP ASM", Release Notes, Jun. 13, 2016, pp. 1-18, version 11.6.1 F5 Networks, Inc.

F5 Networks, Inc., "BIG-IP® Analytics: Implementations", Manual, Jan. 31, 2014, pp. 1-50, Version 11.5.

F5 Networks, Inc., "BIG-IP® Analytics: Implementations", Manual, Aug. 25, 2014, pp. 1-62, v11.6, F5 Networks, Inc.

F5 Networks, Inc., "BIG-IP® Application Security ManagerTM: Getting Started", Manual, Aug. 25, 2014, pp. 1-78, version 11.6, F5 Networks, Inc.

F5 Networks, Inc., "BIG-IP® Application Security ManagerTM: Implementations", Manual, Aug. 25, 2014, pp. 1-420, version 11.6, F5 Networks, Inc.

F5 Networks, Inc., "BIG-IP® Application Security ManagerTM: Implementations", Manual, Jan. 31, 2014, pp. 1-396, Version 11.5.

F5 Networks, Inc., "BIG-IP® Application Security ManagerTM:Implementations", F5 Networks, Inc., Dec. 10, 2014, version 11.6, pp. 1-420.

F5 Networks, Inc., "BIG-IP® Local Traffic Management: Basics", Manual, Aug. 25, 2014, pp. 1-74, version 11.6, F5 Networks, Inc.

F5 Networks, Inc., "BIG-IP® Network Firewall: Policies and Implementations", Manual, Aug. 10, 2016, pp. 1-166, v11.6, F5 Networks, Inc.

F5 Networks, Inc., "BIG-IP® Systems: DoS Protection and Protocol Firewall Implementations", Manual, Aug. 25, 2014, pp. 1-108, v11.6, F5 Networks, Inc.

F5 Networks, Inc., "BIG-IP® TMOS®: Concepts", Manual, Nov. 11, 2014, pp. 1-148, Version 11.5.

F5 Networks, Inc., "BIG-IP® TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, Inc.

(56) References Cited

OTHER PUBLICATIONS

F5 Networks, Inc., "BIG-IP Application Security Manager: Implementations", F5 Networks, Inc., Dec. 10, 2014, version 11.6, pp. 1-420.

* cited by examiner

METHODS FOR PROTECTING CPU DURING DDOS ATTACK AND DEVICES THEREOF

This application claims the benefit of U.S. Provisional Patent Application Ser. No. 62/625,778, filed Feb. 2, 2018, which is hereby incorporated by reference in its entirety.

FIELD

This technology generally relates to methods and devices for network traffic management and, more particularly, to methods for protecting CPU during DDOS attack and devices thereof.

BACKGROUND

Malicious network devices frequently attempt to disrupt the operations of service providers by using network-based attacks such as a "denial of service" (DoS) attack. A DOS attack generally attempts to make a target computing device or network resource, such as a server, unavailable to legitimate clients.

One common instance of a DoS attack involves saturating the target device with external communications requests, such that it cannot respond to legitimate traffic, or it responds so slowly as to be rendered effectively unavailable. Due to the number of requests required to mount such an attack, responsibility for implementing the attack is often distributed across many computing devices. These distributed attacks are therefore known as "distributed denial of service" (DDoS) attacks. Because attacked targets, such as specific web sites or domain names, are often hosted by a server, that server itself may also be targeted by the attack. Further, the server often hosts content on behalf of non-targeted systems or networks, which also may be affected by the attack due to their use of the server.

SUMMARY

A method for protecting CPU during DDOS attack includes monitoring network traffic data from plurality of client devices. Each of the plurality of client devices are classified as a valid device or a potential attacker device based on the monitoring. Next, a determination of when CPU utilization of a network traffic manager apparatus is greater than a stored threshold value is made. The CPU utilization of the network traffic manager increases as a number of the plurality of client devices classified as the potential attacker device increases. One or more network actions are performed on the plurality of client devices classified as the potential attacker device to protect the CPU when the determination indicates the CPU utilization is greater than the stored threshold value.

A non-transitory computer readable medium having stored thereon instructions for protecting CPU during DDOS comprising machine executable code which when executed by at least one processor, causes the processor to perform steps including, monitoring network traffic data from plurality of client devices. Each of the plurality of client devices are classified as a valid device or a potential attacker device based on the monitoring. Next a determination of when CPU utilization of a network traffic manager apparatus is greater than a stored threshold value is made. The CPU utilization of the network traffic manager increases as a number of the plurality of client devices classified as the potential attacker device increases. One or more network actions are performed on the plurality of client devices classified as the potential attacker device to protect the CPU when the determination indicates the CPU utilization is greater than the stored threshold value.

A network traffic management apparatus including at least one of configurable hardware logic configured to be capable of implementing or a processor coupled to a memory and configured to execute programmed instructions stored in the memory to monitoring network traffic data from plurality of client devices. Each of the plurality of client devices are classified as a valid device or a potential attacker device based on the monitoring. Next a determination of when CPU utilization of a network traffic manager apparatus is greater than a stored threshold value is made. The CPU utilization of the network traffic manager increases as a number of the plurality of client devices classified as the potential attacker device increases. One or more network actions are performed on the plurality of client devices classified as the potential attacker device to protect the CPU when the determination indicates the CPU utilization is greater than the stored threshold value.

A network traffic management system, comprising one or more traffic management apparatuses, client devices, or server devices, the network traffic management system comprising memory comprising programmed instructions stored thereon and one or more processors configured to be capable of executing the stored programmed instructions to monitor network traffic data from plurality of client devices. Each of the plurality of client devices are classified as a valid device or a potential attacker device based on the monitoring. Next a determination of when CPU utilization of a network traffic manager apparatus is greater than a stored threshold value is made. The CPU utilization of the network traffic manager increases as a number of the plurality of client devices classified as the potential attacker device increases. One or more network actions are performed on the plurality of client devices classified as the potential attacker device to protect the CPU when the determination indicates the CPU utilization is greater than the stored threshold value.

This technology provides a number of advantages including providing a method, non-transitory computer readable medium, apparatus, and system that assist with protecting a CPU during a DDOS attack. With this technology, malicious devices can be separated into a different group for remediation while other unaffected devices may continue operations to maximize the CPU utilization.

DETAILED DESCRIPTION

Figure 1:
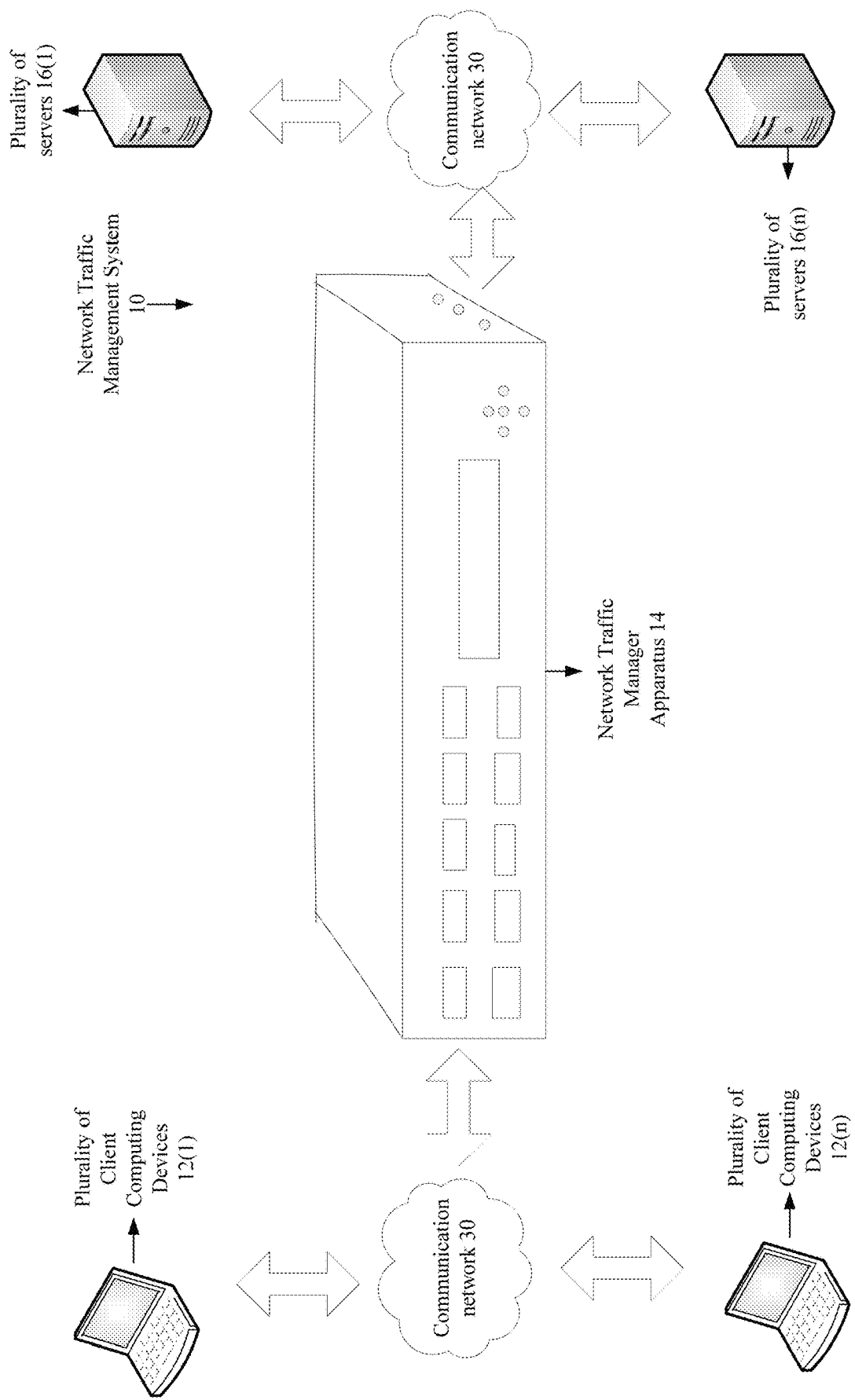
FIG. 1 is an example of a block diagram of a network traffic management system including a network traffic management apparatus for protecting a CPU during a DDOS attack.
Figure 2:
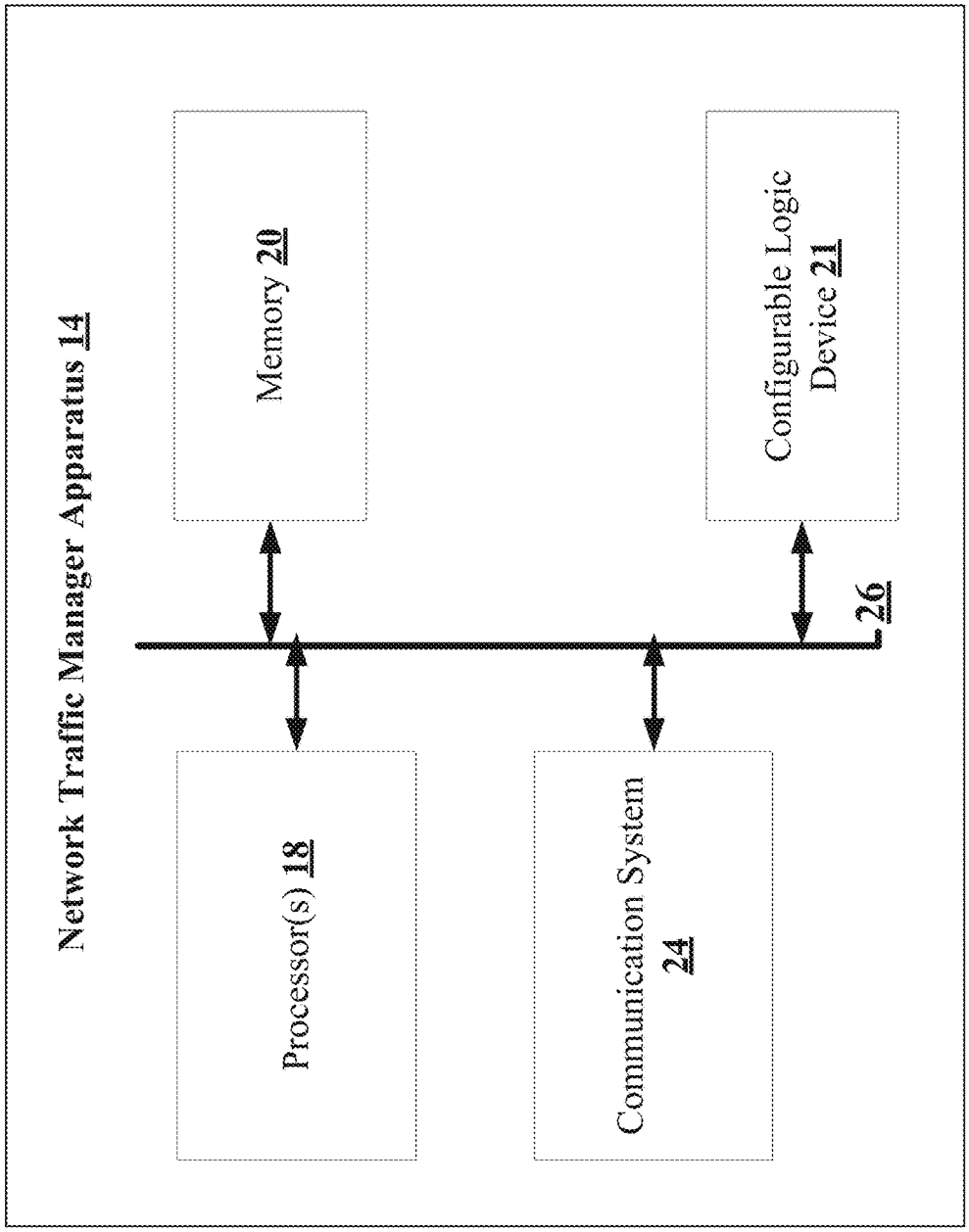
FIG. 2 is an example of a block diagram of a network traffic management apparatus.

An example of a network environment 10 which incorporates a network traffic management system for protecting a central processing unit (CPU) during a distributed denial of service (DDOS) attack with the network traffic manager apparatus 14 is illustrated in FIGS. 1 and 2. The exemplary environment 10 includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including protecting a CPU during a DDOS attack.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the plurality of servers 16(1)-16(n) and the network traffic manager apparatus 14 may be coupled together via other topologies.

The network traffic manager apparatus 14 assists with protecting CPU during a DDOS attack as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
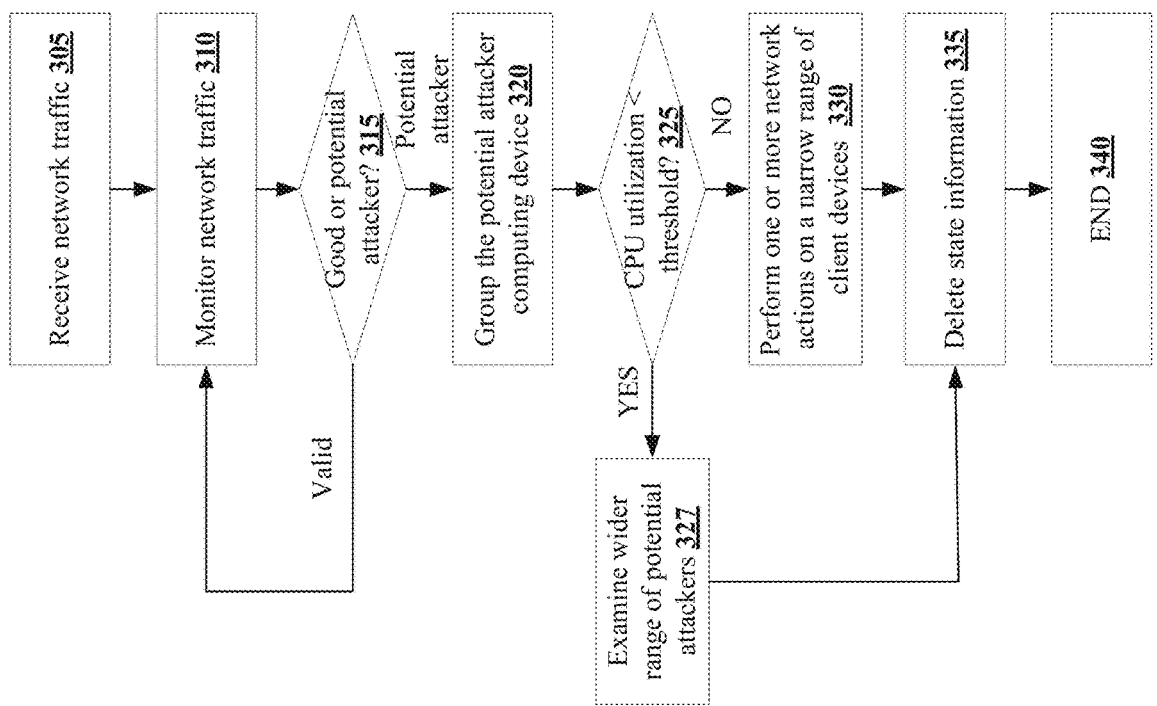
FIG. 3 is an exemplary flowchart of a method for protecting a CPU during a DDOS attack.
Figure 4:
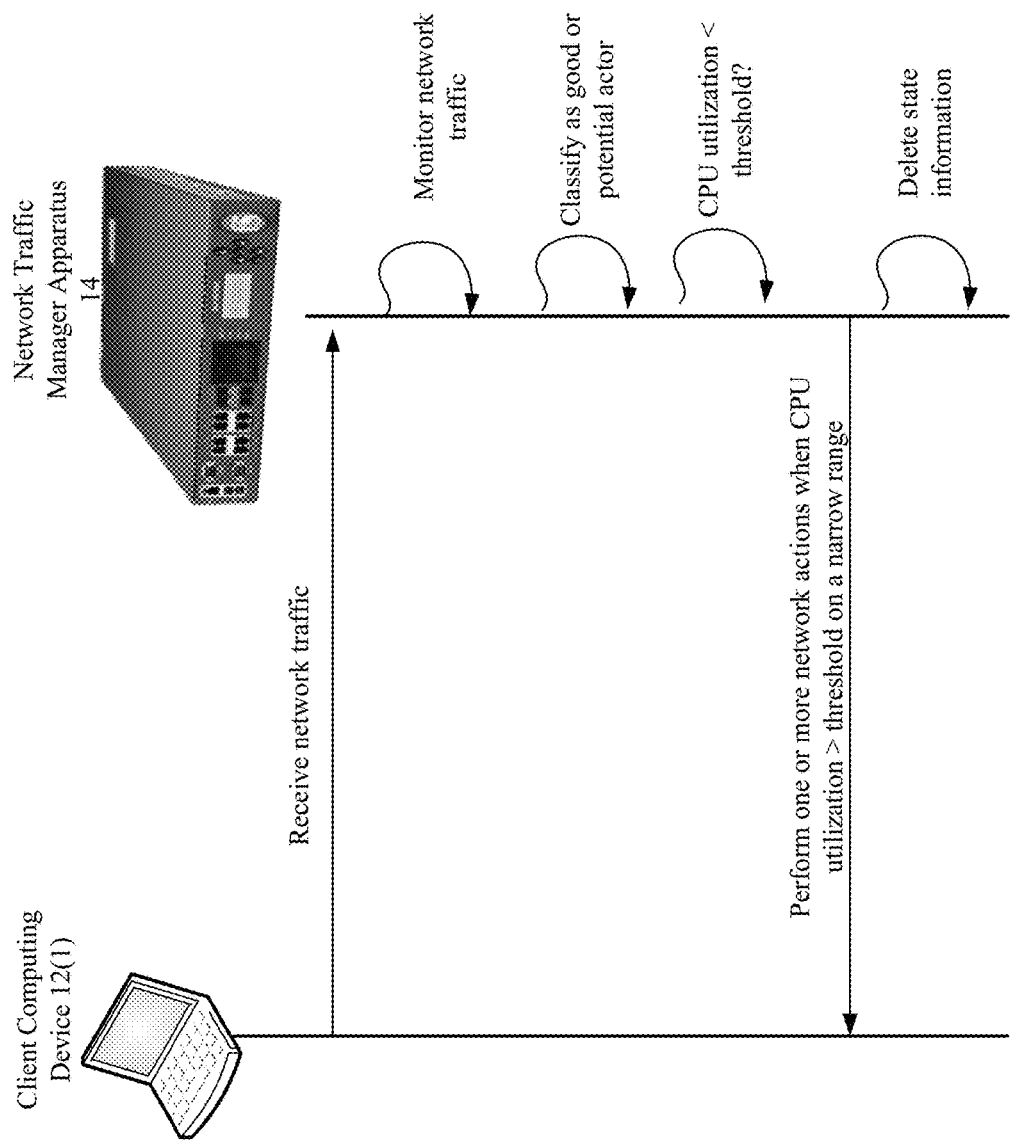
FIG. 4 is an exemplary sequence diagram for protecting a CPU during a DDOS attack.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIG. 3. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits ("ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n) and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the plurality of servers 16(1)-

16(*n*) via the network traffic manager apparatus 14. Additionally, the plurality of client computing devices 12(1)-12(*n*) can include any type of computing device that can receive, render, and facilitate user interaction, such as client computers, network computer, mobile computers, mobile phones, virtual machines (including cloud-based computer), or the like. Each of the plurality of client computing devices 12(1)-12(*n*) utilizes the network traffic manager apparatus 14 to conduct one or more operations with the web application servers 16(1)-16(*n*), such as to obtain data and/or access the applications from one of the web application servers 16(1)-16(*n*), by way of example only, although other numbers and/or types of systems could be utilizing these resources and other types and numbers of functions utilizing other types of protocols could be performed.

Each of the plurality of servers 16(1)-16(*n*) of the network traffic management system include a central processing unit (CPU) or processor, a memory, and a communication system, which are coupled together by a bus or other link, although other numbers and/or types of network devices could be used. Generally, the plurality of servers 16(1)-16(*n*) process requests for providing access to one or more enterprise web applications received from the plurality of client computing devices 12(1)-12(*n*), network traffic manager apparatus 14, via the communication network 30 according to the HTTP-based application RFC protocol or the CIFS or NFS protocol in this example, but the principles discussed herein are not limited to this example and can include other application protocols. A series of applications may run on the plurality web application servers 16(1)-16(*n*) that allows the transmission of data requested by the plurality of client computing devices 12(1)-12(*n*), or the network traffic manager apparatus 14. The plurality of servers 16(1)-16(*n*) may provide data or receive data in response to requests directed toward the respective applications on the plurality web application servers 16(1)-16(*n*) from the plurality of client computing devices 12(1)-12(*n*) or the network traffic manager apparatus 14. It is to be understood that the plurality of servers 16(1)-16(*n*) may be hardware or software or may represent a system with multiple external resource servers, which may include internal or external networks. In this example the plurality of servers 16(1)-16(*n*) may be any version of Microsoft®IIS servers or Apache® servers, although other types of servers may be used.

Although the plurality of servers 16(1)-16(*n*) are illustrated as single servers, one or more actions of the plurality of servers 16(1)-16(*n*) may be distributed across one or more distinct network computing devices. Moreover, the plurality of servers 16(1)-16(*n*) are not limited to a particular configuration. Thus, the plurality of plurality web application servers 16(1)-16(*n*) may contain a plurality of network computing devices that operate using a master/slave approach, whereby one of the network computing devices of the plurality of servers 16(1)-16(*n*) operate to manage and/or otherwise coordinate operations of the other network computing devices. The plurality of servers 16(1)-16(*n*) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-16(*n*) depicted in FIG. 1 can operate within network traffic manager apparatus 14 rather than as a stand-alone server communicating with network traffic manager apparatus 14 via the communication network(s) 30. In this example the plurality of servers 16(1)-16(*n*) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(*n*) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(*n*), the network traffic manager apparatus 14, and the plurality of servers 16(1)-16(*n*), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(*n*), the plurality of servers 16(1)-16(*n*), for example, may be configured to operate as virtual instances on the same physical machine. In other words, one or more of network traffic manager apparatus 14, the plurality of client computing devices 12(1)-12(*n*), or the plurality of servers 16(1)-16(*n*) illustrated in FIG. 1 may operate on the same physical device rather than as separate devices communicating through a network as depicted in FIG. 1. There may be more or fewer plurality of client computing devices 12(1)-12(*n*), network traffic manager apparatus 14, or the plurality of servers 16(1)-16(*n*) than depicted in FIG. 1. The plurality of client computing devices 12(1)-12(*n*), the plurality of servers 16(1)-16(*n*) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for protecting a CPU during a DDOS attack will now be described with reference to FIGS. 1-4. First in step 305, the network traffic manager apparatus 14 receives network traffic from a plurality of client computing devices 12(1)-12(n), although the network traffic manager apparatus 14 can receive network traffic from other types and/or numbers of devices or other systems. By way of example, network traffic may relate to a plurality of network packets sent and receive by the plurality of client computing devices 12(1)-12(n).

Next in step 310, the network traffic manager apparatus 14 monitors the network traffic from the plurality of client computing devices 12(1)-12(n) for a period of time. By way of example, the period of time could be a period of five to ten seconds, although the network traffic manager apparatus 14 can monitor the network traffic for other durations of time. Additionally in this example, the network traffic manager apparatus 14 monitors the network traffic at a time of peak activity, although the network traffic manager apparatus 14 can monitor the network traffic during other time periods.

In step 315, the network traffic manager apparatus 14 classifies each of the plurality of client computing devices 12(1)-12(n) either as a valid client device or a potential attacker computing device, based on the monitoring of the network traffic, although the network traffic manager apparatus 14 can classify in other manners. In this example, the network traffic manager apparatus 14 classifies the plurality of client computing devices 12(1)-12(n) as valid client device or as a potential attacker computing device based on parameter such as a type of each of the requests, a number of requests, and/or an IP address of the client computing device, although the network traffic manager apparatus 14 can classify the plurality of client computing devices 12(1)-12(n) based on other types and/or numbers of parameters. Accordingly, when the network traffic manager apparatus 14 classifies one of the plurality of client computing devices 12(1)-12(n) as a valid client device, then a Yes branch is taken back to step 310 where the network traffic manager apparatus 14 continues to monitor the network traffic. However, when the network traffic manager apparatus 14 classifies one of the plurality of client computing devices 12(1)-12(n) as a potential attacker computing device, then the No branch is taken to step 320.

Next in step 320, the network traffic manager apparatus 14 creates a group of the one or more of the plurality of client computing devices 12(1)-12(n) classified as being a potential attacker computing device, although other types and/or numbers of groups can be formed. Additionally in this example, when the network traffic manager apparatus 14 determines that there are more than one plurality of client computing devices 12(1)-12(n) classified as potential attacker computing device, the network traffic manager apparatus 14 can create multiple groups including a number of plurality client computing devices 12(1)-12(n) classified as a potential attacker computing device.

In step 325, the network traffic manager apparatus 14 identifies the CPU (of the network traffic manager apparatus 14) utilization of each of the groups created in step 320. In this example, the group of potential attacker computing device sends numerous requests (DDOS attack) to the network traffic manager apparatus 14 to increase the CPU utilization of the network traffic manager apparatus 14, although the group of potential attacker computing device can use other techniques to increase the CPU utilization. Accordingly, when the CPU utilization of one group of the multiple groups of potential attacker computing device is below a stored threshold limit, then No branch is taken back to step 327. In step 327, the network traffic manager apparatus 14 performs one or more network actions on all the created groups of plurality of client computing devices 12(1)-12(n) classified as potential attacker devices to reduce CPU utilization and the exemplary flow proceeds to step 335.

However, when the CPU utilization of one group of the multiple groups of potential attacker computing devices is equal to or above the defined threshold, then the Yes branch is taken to step 330. In step 330, the network traffic manager apparatus 14 performs one or more network actions on one of the group of plurality of client computing devices 12(1)-12(n) classified as potential attacker devices to reduce CPU utilization. By way of example, one or more network actions include: blocking potential attacker computing devices from sending requests, requesting the potential attacker device to send only HTTP request at TCP level and/or dropping the HTTP request, although other types and/or numbers of network actions could be executed to reduce CPU utilization.

In step 335, the network traffic manager apparatus 14 deletes the state information associated with all the potential attacker computing devices in the group and the exemplary method ends at step 340. In this example, once the network traffic manager apparatus 14 performs the one or more network actions and deletes the state information, the CPU utilization of the network traffic manager apparatus 14 decreases and the network traffic manager apparatus 14 can perform one or more network actions on the remaining groups of the client computing devices 12(1)-12(n) classified as potential attacker computing devices or go back to monitoring network traffic data as illustrated in step 310.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for protecting CPU during a DDOS attack, the method comprising:
    monitoring network traffic data from a plurality of client devices;
    classifying each of the plurality of client devices as a valid client device or a potential attacker device based on the monitoring;
    in response to the classification of portion of the plurality of client devices as the potential attacker, determining when CPU utilization associated with the monitored network traffic from the portion of the plurality of client devices classified as the potential attacker of a network traffic manager apparatus is greater than a stored threshold value; and
    performing one or more network actions on the portion of plurality of client devices classified as the potential attacker to protect the CPU when the determination indicates the CPU utilization is greater than the stored threshold value.

2. The method as set forth in claim 1 further comprising, adding the portion of the plurality of client devices classified as the potential attacker to a group including other potential attackers.

3. The method as set forth in claim 1 further comprising, deleting state information associated with the portion of the plurality of client devices classified as the potential attacker.

4. The method as set forth in claim 1 wherein the one or more network actions comprises:
    rejecting one or more requests sent by the portion of the plurality of client devices classified as the potential attacker, or
    accepting only a plurality of HTTP requests via a TCP connection and dropping the packets via the TCP connection.

5. A non-transitory computer readable medium having stored thereon instructions for protecting a CPU during a DDOS attack comprising executable code which when executed by one or more processors, causes the processors to:
    monitor network traffic data from a plurality of client devices;
    classify each of the plurality of client devices as a valid client device or a potential attacker device based on the monitoring;
    in response to the classification of portion of the plurality of client devices as the potential attacker, determine when CPU utilization associated with the monitored network traffic from the portion of the plurality of client devices classified as the potential attacker of a network traffic manager apparatus is greater than a stored threshold value; and
    perform one or more network actions on the portion of plurality of client devices classified as the potential attacker to protect the CPU when the determination indicates the CPU utilization is greater than the stored threshold value.

6. The medium as set forth in claim 5 further comprises, add the portion of the plurality of client devices classified as the potential attacker to a group including other potential attackers.

7. The medium as set forth in claim 5 further comprises, delete state information associated with the portion of the plurality of client devices classified as the potential attacker.

8. The medium as set forth in claim 5 wherein the network action comprises:
    reject one or more requests sent by the portion of the plurality of client devices classified as the potential attacker, or
    accept only a plurality of HTTP requests via a TCP connection and dropping the packets via the TCP connection.

9. A network traffic manager apparatus, comprising memory comprising programmed instructions stored in the memory and one or more processors configured to be capable of executing the programmed instructions stored in the memory to:
    monitor network traffic data from a plurality of client devices;
    classify each of the plurality of client devices as a valid client device or a potential attacker device based on the monitoring;
    in response to the classification of portion of the plurality of client devices as the potential attacker, determine when CPU utilization associated with the monitored network traffic from the portion of the plurality of client devices classified as the potential attacker of a network traffic manager apparatus is greater than a stored threshold value; and
    perform one or more network actions on the portion of plurality of client devices classified as the potential attacker to protect the CPU when the determination indicates the CPU utilization is greater than the stored threshold value.

10. The apparatus as set forth in claim 9 wherein the one or more processors are further configured to be capable of executing the programmed instructions stored in the memory to add the portion of the plurality of client devices classified as the potential attacker to a group including other potential attackers.

11. The apparatus as set forth in claim 9 wherein the one or more processors are further configured to be capable of executing the programmed instructions stored in the memory to delete state information associated with the portion of the plurality of client devices classified as the potential attacker.

12. The apparatus as set forth in claim 9 wherein the network action comprises:
    reject one or more requests sent by the portion of the plurality of client devices classified as the potential attacker, or
    accept only a plurality of HTTP requests via a TCP connection and dropping the packets via the TCP connection.

13. A network traffic management system, comprising memory comprising programmed instructions stored thereon and one or more processors configured to be capable of executing the stored programmed instructions to:
    monitor network traffic data from a plurality of client devices;
    classify each of the plurality of client devices as a valid client device or a potential attacker device based on the monitoring;
    in response to the classification of portion of the plurality of client devices as the potential attacker, determine when CPU utilization associated with the monitored network traffic from the portion of the plurality of client devices classified as the potential attacker of a network traffic manager apparatus is greater than a stored threshold value; and perform one or more network actions on the portion of plurality of client devices classified as the potential attacker to protect the CPU when the determination indicates the CPU utilization is greater than the stored threshold value.

14. The network traffic management system of claim 13 wherein the one or more processors are further configured to be capable of executing the programmed instructions stored in the memory to add the portion of the plurality of client devices classified as the potential attacker to a group including other potential attackers.

15. The network traffic management system of claim 13 wherein the one or more processors are further configured to be capable of executing the programmed instructions stored in the memory to delete state information associated with the portion of the plurality of client devices classified as the potential attacker.

16. The network traffic management system of claim 13 wherein the network action comprises:
   reject one or more requests sent by the portion of the plurality of client devices classified as the potential attacker, or
   accept only a plurality of HTTP requests via a TCP connection and dropping the packets via the TCP connection.

* * * * *